(12) United States Patent
Chou

(10) Patent No.: US 7,706,063 B2
(45) Date of Patent: Apr. 27, 2010

(54) IMAGE CAPTURING DEVICE WITH FOCUSING ASSEMBLY

(75) Inventor: Backer Chou, Taipei Hsien (TW)

(73) Assignee: Vast Technologies Inc., San Chung, Taipei Hsien (TW)

( * ) Notice: Subject to any disclaimer, the term of this patent is extended or adjusted under 35 U.S.C. 154(b) by 279 days.

(21) Appl. No.: 11/863,288

(22) Filed: Sep. 28, 2007

(65) Prior Publication Data

US 2009/0086312 A1 Apr. 2, 2009

(51) Int. Cl.
 *G02B 23/00* (2006.01)
(52) U.S. Cl. .................. 359/425; 359/363; 359/426
(58) Field of Classification Search .......... 359/363, 359/425, 426
 See application file for complete search history.

(56) References Cited

U.S. PATENT DOCUMENTS 7,102,817 B1 * 9/2006 Wu .............................. 359/384

2004/0156628 A1 * 8/2004 Tanaka ........................ 396/72
2008/0058629 A1 * 3/2008 Seibel et al. ................ 600/368

* cited by examiner

*Primary Examiner*—Joshua L Pritchett

(57) ABSTRACT

An image capturing device with a focusing assembly comprises a case formed by an upper casing and a lower casing; a cover for sealing the lower casing; an lower side of the cover having an opening for capturing images of outside objects; a base installed at a connection between the upper casing and the lower casing; an image sensor installed at a lower side of the base for capturing images through an opening of the front cover; a focus adjusting unit including an object lens, an adjusting wheel, an inner tube and an outer adjusting tube; the outer adjusting tube being located within the lower casing and has a longitudinal retaining groove at an inner side thereof; the inner tube being received in the outer adjusting tube; the inner tube having a helical groove; an outer side of the adjusting wheel having a post for driving the adjusting wheel.

5 Claims, 5 Drawing Sheets

IMAGE CAPTURING DEVICE WITH FOCUSING ASSEMBLY

FIELD OF THE INVENTION

The present invention relates to cameras, and particularly to an image capturing device with a focusing assembly, in that the focus is adjustable smoothly and steadily and the adjustment of the focus is stepless and precise so as to have a high quality image. Furthermore, the error in manufacturing is small.

BACKGROUND OF THE INVENTION

Imaging devices are widely used. Commercially, DV cameras are familiar ones. In that keys and electronic circuits are sued to operate the camera so that the images are recorded to a memory through CMOS or CCD sensors.

U.S. Pat. No. 7,102,817, discloses an object lens of holdable microscope. The microscope includes a telescopic elements installed upon a casing. The element includes an inner tube, an outer tube, a guide rod and an object lens. The outer tube is rotatable in a through hole of the casing. By the relative relation of the inner tube, outer tube and the guide rod, the distance between the object lens and an object to be viewed can be changed so as to adjust the focus of the microscope.

However the prior art has the following defects.

The adjusting wheel in the microscope is made of plastic injection which has a large error and is not tolerable to the variation of temperature.

The guide rod is made by two metal bars as a longitudinal guide unit. The inner tube has threads for matching the object lens and thus for rotating and focusing. However the engagement of the inner tube and outer tube are not preferred so that vibrations and deviation occur and thus the image will distort.

The inner tube can not precisely engage to the outer tube and thus idly rotation occurs. As a result, the operation is difficult and not precisely.

SUMMARY OF THE INVENTION

Accordingly, the primary object of the present invention is to provide an image capturing device with a focusing assembly, in that the focus is adjustable smoothly and steadily and the adjustment of the focus is stepless and precise so as to have a high quality image. Furthermore, the error in manufacturing is small.

To achieve above objects, the present invention provides an image capturing device with a focusing assembly, comprising: a case formed by an upper casing and a lower casing; a cover for sealing a lower opening of the lower casing; an lower side of the cover having an opening for capturing images of outside objects; a base installed at a connection between the upper casing and the lower casing; an image sensor installed at a lower side of the base for capturing images through an opening of the front cover; a focus adjusting unit including an object lens, an adjusting wheel, an inner tube and an outer adjusting tube; the outer adjusting tube being located within the lower casing and has a longitudinal retaining groove at an inner side thereof; the inner tube being received in the outer adjusting tube; the inner tube having a helical groove; an outer side of the adjusting wheel having a post for driving the adjusting wheel; the post passing through the helical groove of the inner tube to be retained in the retaining groove of the outer adjusting tube; the object lens having outer thread so that the object lens is locked to an interior of the adjusting wheel. By rotating the outer adjusting tube with respect to the inner tube through the opening of the lower casing, the object lens will slide in a range of the helical groove of the inner tube so as to adjust the focus.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
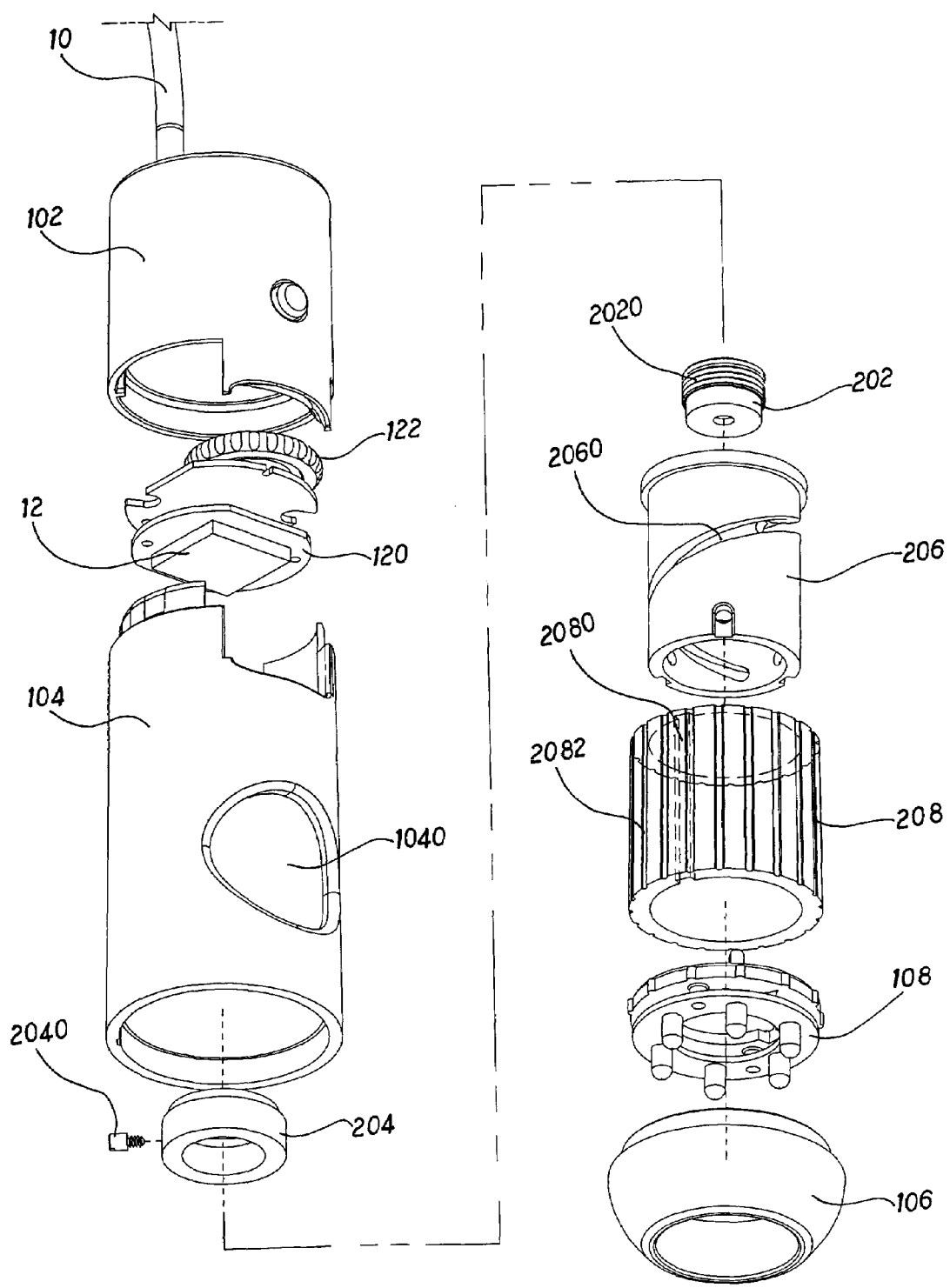
FIG. 1 is a structural exploded view of the image capturing device with a focusing assembly.
Figure 2:
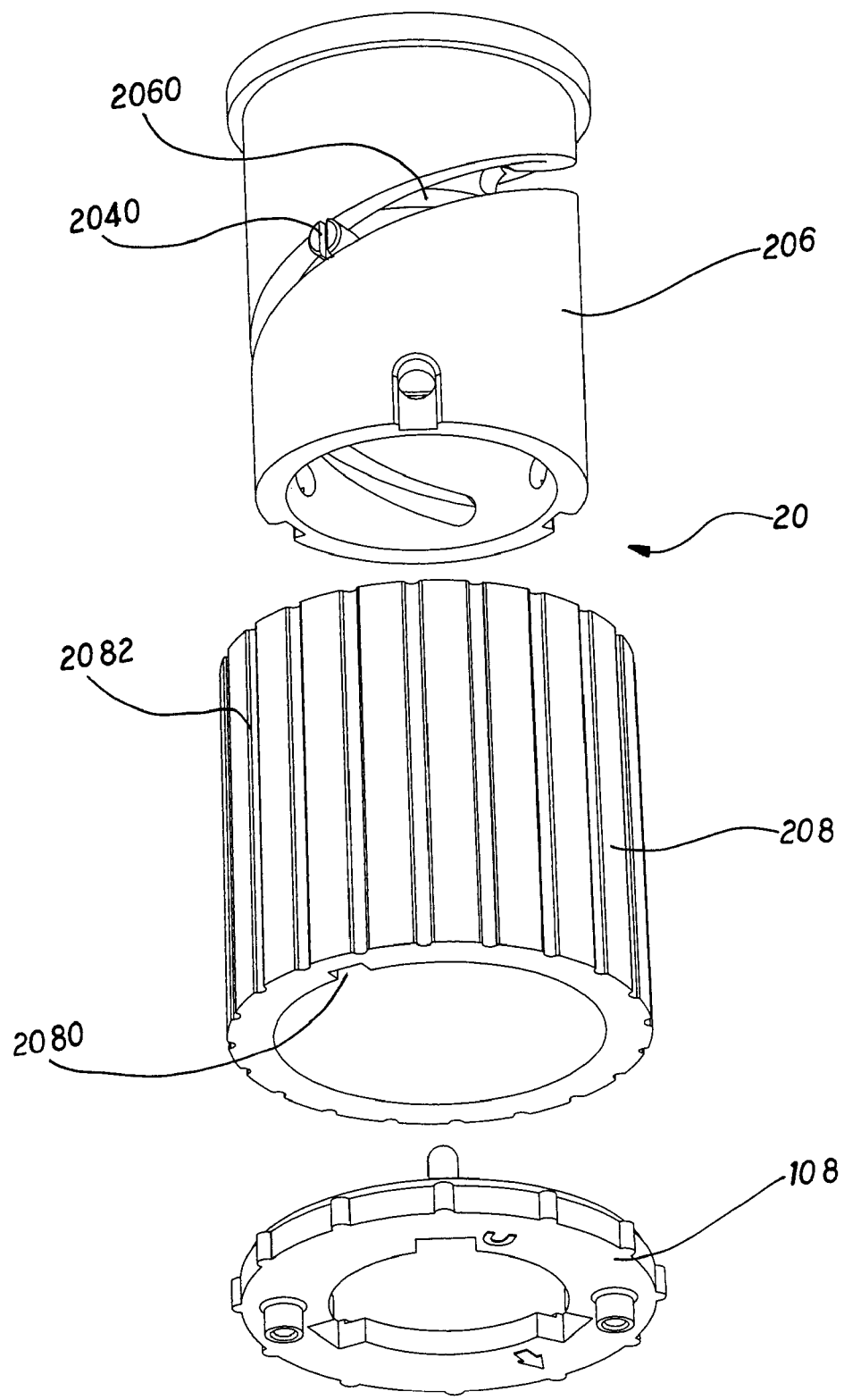
FIG. 2 is a perspective view of the image capturing device with a focusing assembly of the present invention.

Referring to FIG. 1, the image capturing device of the present invention is illustrated.

A case is formed by an upper casing 102 and a lower casing 104.

An upper end of the upper casing 102 is connected to a signal transmission line 10 for transmitting image signals.

A cover 106 serves to seal a lower opening of the lower casing 104. A lower side of the cover 106 has an opening for capturing images of outside objects.

A base 120 is installed at a connection between the upper casing 102 and the lower casing 104.

An image sensor 12 is installed at a lower side of the base 120 for capturing images through an opening of the cover 106. An upper side of the base 120 has a rotary wheel 122 for adjusting illumination of a lighting emitting unit 108. A part of the rotary wheel 122 protrudes from a slot between the upper casing 102 and the lower casing 104.

The lower casing 104 has an opening 1040.

A focus adjusting unit 20 includes an object lens 202, an adjusting wheel 204, an inner tube 206 and an outer adjusting tube 208.

The outer adjusting tube 208 is located within the lower casing 104 and has a longitudinal retaining groove 2080 at an inner side thereof.

The inner tube 206 is received in the outer adjusting tube 208. The inner tube 206 has a helical groove 2060.

An outer side of the adjusting wheel 204 has a post 2040 for driving the adjusting wheel 204. The post 2040 passes through the helical groove 2060 of the inner tube 206 to be retained in the retaining groove 2080 of the outer adjusting tube 208.

The object lens 202 has outer thread 2020 so that the object lens 202 is locked to an interior of the adjusting wheel 204. However other ways are permissible to lock the object lens 202 to the adjusting wheel 204, such as buckling, or the object lens 202 is combined with the adjusting wheel 204. However herein the structure shown in the drawing is used to explain the contents of the present invention.

Thus, from above structure, by rotating the outer adjusting tube 208 with respect to the inner tube 206 through the opening 1040 of the lower casing 104, the object lens 202 will slide in a range of the helical groove 2060 of the inner tube 206 so as to adjust the focus.

A lighting emitting unit 108 is located between the lower casing 104 and the focus adjusting unit 20. The lighting emitting unit 108 is connected with a power wire (not shown, which is known in the prior art) for supplying power from a power source (not shown, which is known in the prior art).

Figure 3:
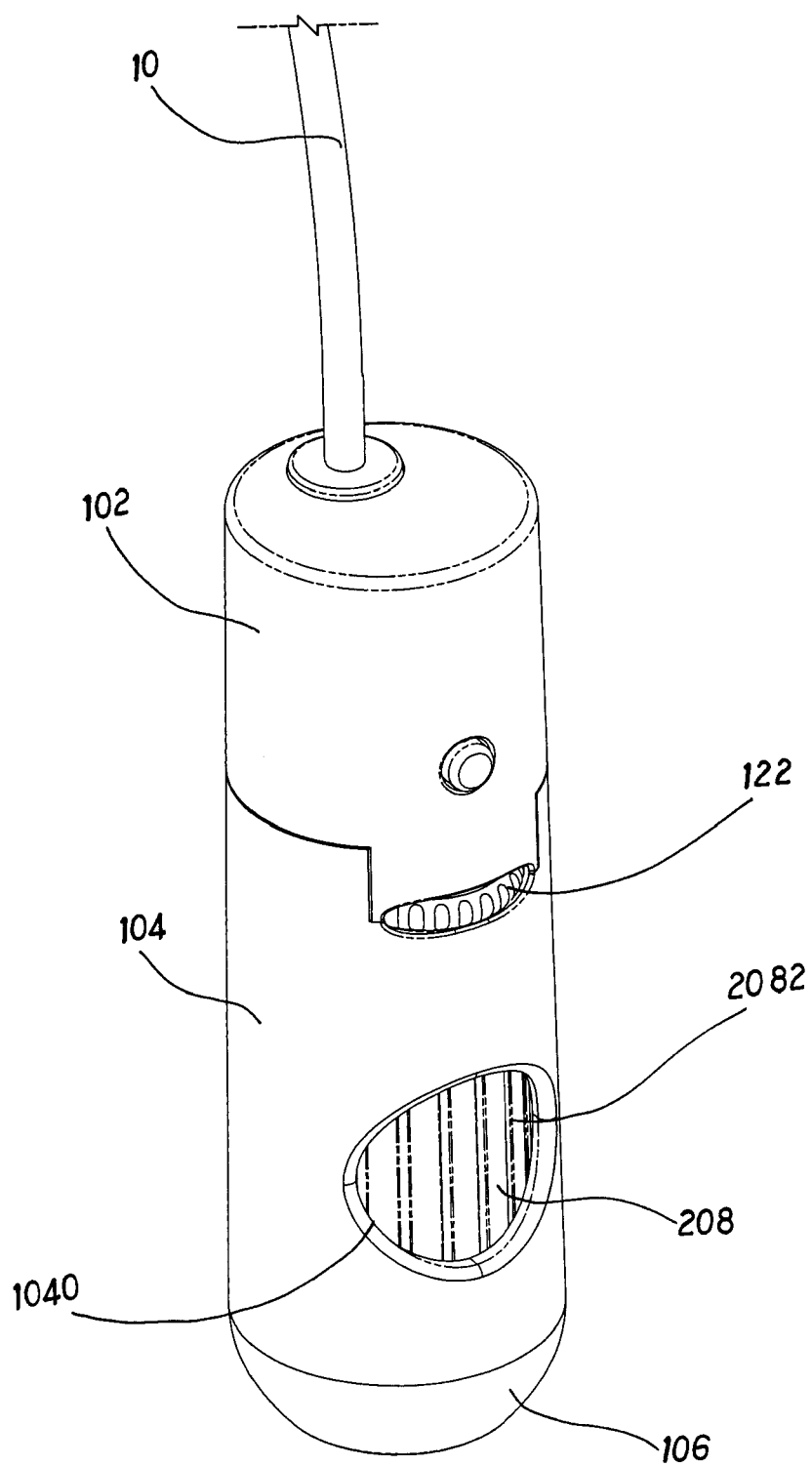
FIG. 3 is an assembled perspective view of the present invention.

An outer side of the outer adjusting tube 208 may be formed with teeth 2082 or textures, or patterns, as shown in FIG. 3 so as to increase friction.

Figure 4:
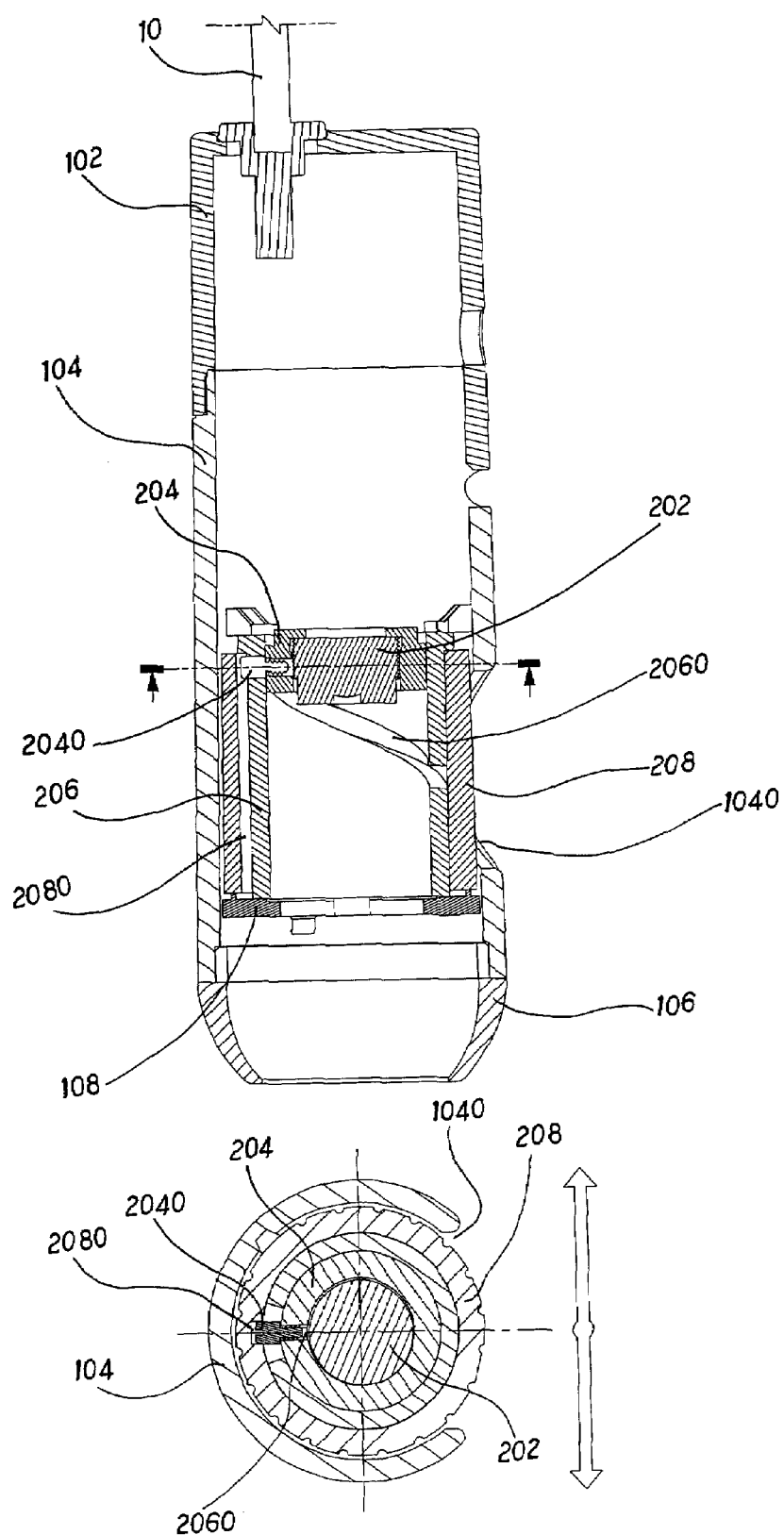
FIG. 4 is a schematic view about a first action of the image capturing device with a focusing assembly of the present invention.
Figure 5:
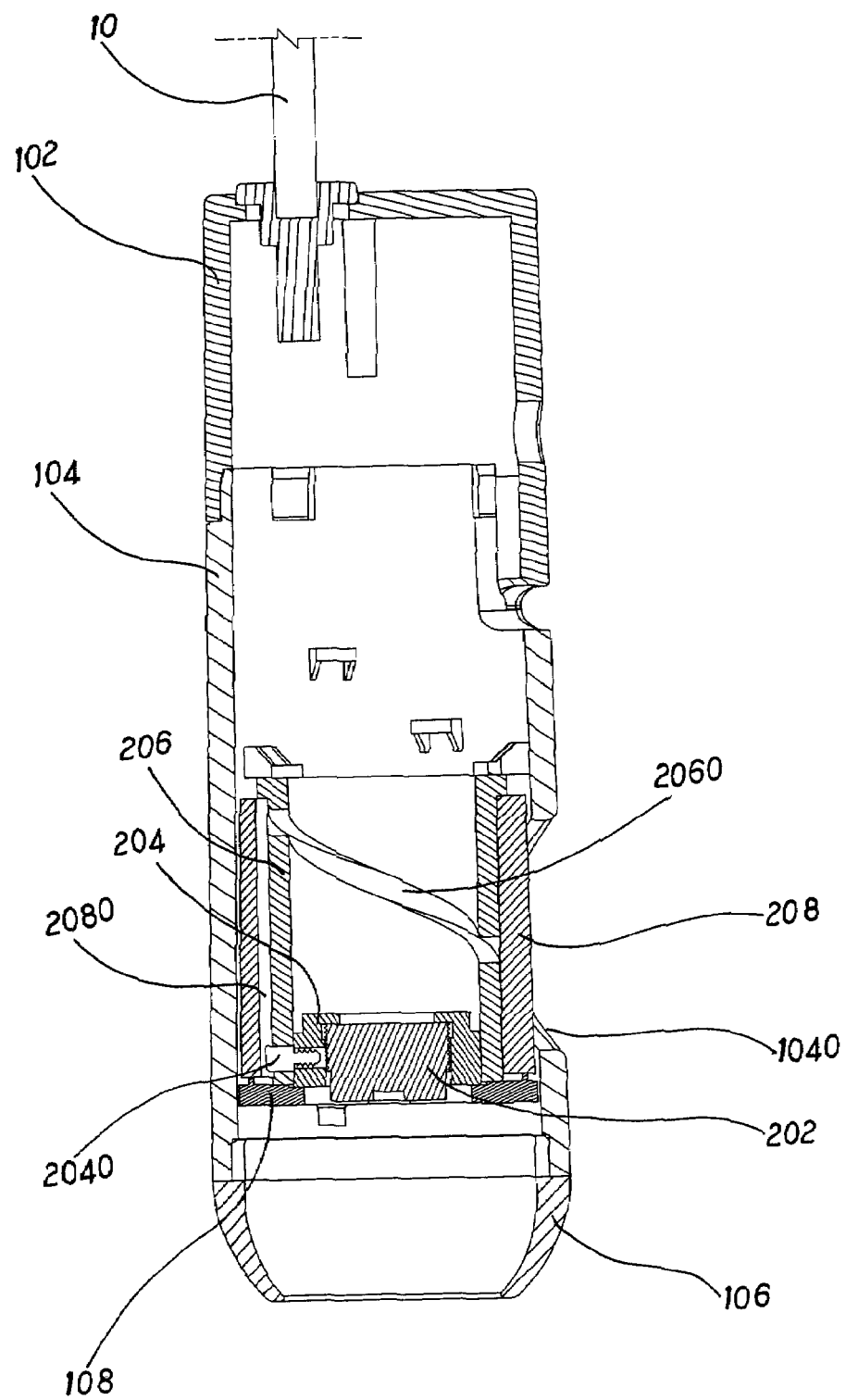
FIG. 5 is a schematic view about the second action of the image capturing device with a focusing assembly of the present invention.

Referring to FIGS. 4 and 5, the operation of the present invention is illustrated. FIG. 4 shows that the object lens 202 is at an non-adjusting position. FIG. 5 shows that the position of the object lens 202 after adjustment. The object lens 202 is locked in the adjusting wheel 204. The post 2040 serves to supporting the adjusting wheel 204 so that the adjusting wheel 204 is engaged in the inner tube 206. The inner tube 206 will be fixed. Through the opening 1040 of the outer adjusting tube 208, rotating the outer adjusting tube 208, the post 2040 will move along the retaining groove 2080 of the outer adjusting tube 208 so that the adjusting wheel 204 and the object lens 202 move therewith. The operation is smooth.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An image capturing device with a focusing assembly, comprising:
   a case formed by an upper casing and a lower casing
   a cover for scaling a lower opening of the lower casing; a lower side of the cover having an opening for capturing images of outside objects;
   a base installed at a connection between the upper casing and the lower casing;
   an image sensor installed at a lower side of the base for capturing images through an opening of the front cover;
   a focus adjusting unit including an object lens, an adjusting wheel, an inner tube and an outer adjusting tube;
   the outer adjusting tube being located within the lower casing and having a longitudinal retaining groove at an inner side thereof;
   the inner tube being received in the outer adjusting tube; the inner tube having a helical groove;
   an outer side of the adjusting wheel having a post for driving the adjusting wheel; the post passing through the helical groove of the inner tube to be retained in the retaining groove of the outer adjusting tube;
   the object lens having an outer thread so that the object lens is locked to an interior of the adjusting wheel;
   wherein by rotating the outer adjusting tube with respect to the inner tube through the lower opening of the lower casing, the object lens will slide in a range of the helical groove of the inner tube so as to adjust a focus; and
   wherein an upper side of the base has a rotary wheel for adjusting illumination of a lighting emitting unit; and a part of the rotary wheel protrudes from a slot between the upper casing and the lower casing.

2. The image capturing device with a focusing assembly as claimed in claim 1, wherein the upper casing is connected to a signal transmission line for transmitting image signals.

3. The image capturing device with a focusing assembly as claimed in claim 1, wherein a lighting emitting unit is located between the lower casing and the focus adjusting unit.

4. The image capturing device with a focusing assembly as claimed in claim 1, wherein the lower casing has an opening so that a part of the outer adjusting tube exposes out from the opening of the lower casing.

5. The image capturing device with a focusing assembly as claimed in claim 1, wherein an outer side of the outer adjusting tube is formed with teeth or textures or patterns.

* * * * *